US009705790B2

(12) United States Patent
Matsuya et al.

(10) Patent No.: US 9,705,790 B2
(45) Date of Patent: Jul. 11, 2017

(54) INFORMATION PROCESSING APPARATUS, COMMUNICATION SYSTEM, AND COMMUNICATION METHOD

(71) Applicant: YAHOO JAPAN CORPORATION, Tokyo (JP)

(72) Inventors: Norifumi Matsuya, Tokyo (JP); Tsunayoshi Egawa, Tokyo (JP); Nobuhiro Takasawa, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 653 days.

(21) Appl. No.: 13/903,477

(22) Filed: May 28, 2013

(65) Prior Publication Data

US 2013/0326027 A1 Dec. 5, 2013

(30) Foreign Application Priority Data

May 29, 2012 (JP) ................................ 2012-121456

(51) Int. Cl.
*G06F 15/16* (2006.01)
*H04L 12/781* (2013.01)
(Continued)

(52) U.S. Cl.
CPC ............ *H04L 45/52* (2013.01); *H04L 45/741* (2013.01); *H04L 61/1511* (2013.01); *H04L 61/251* (2013.01)

(58) Field of Classification Search
CPC ..... H04L 69/167; H04L 45/52; H04L 45/741; H04L 61/1511; H04L 61/251
(Continued)

(56) References Cited

U.S. PATENT DOCUMENTS 7,184,484 B1 * 2/2007 Kim .............................. 375/257
2004/0013130 A1 * 1/2004 Blanchet et al. ............. 370/466
(Continued)

FOREIGN PATENT DOCUMENTS

JP A-2008-250976 10/2008
JP A-2010-166311 7/2010
JP A-2010-178178 8/2010

OTHER PUBLICATIONS

Sep. 10, 2013 Office Action issued in Japanese Patent Application No. 2012-121456 (with English translation).

*Primary Examiner* — June Sison
*Assistant Examiner* — Dixon Dabipi
(74) *Attorney, Agent, or Firm* — Oliff PLC

(57) ABSTRACT

An information processing apparatus is connected to and communicates with a terminal connected to a first communication network and a second communication network based on a predetermined communication protocol. The first and the second communication network are operable using the predetermined communication protocol. The second communication network is a closed communication network. The information processing apparatus includes first and second communication units. The first communication unit communicates with the terminal via the first communication network based on the predetermined communication protocol. The second communication unit communicates with the terminal based on the predetermined communication protocol via a relay unit arranged in a communication line between the second communication network and the information processing apparatus. The first and the second communication units have the same IP address having an anycast relation as an IP address of the predetermined communication protocol.

11 Claims, 8 Drawing Sheets

(51) Int. Cl.
*H04L 12/749* (2013.01)
*H04L 29/12* (2006.01)

(58) Field of Classification Search
USPC .......................................... 709/219
See application file for complete search history.

(56) References Cited

U.S. PATENT DOCUMENTS

2006/0209885 A1* 9/2006 Hain et al. .................... 370/465
2006/0285532 A1* 12/2006 Radziewicz et al. ......... 370/352
2013/0326027 A1* 12/2013 Matsuya et al. .............. 709/219

* cited by examiner

INFORMATION PROCESSING APPARATUS, COMMUNICATION SYSTEM, AND COMMUNICATION METHOD

CROSS-REFERENCE TO RELATED APPLICATIONS

The present application claims priority to and incorporates by reference the entire contents of Japanese Patent Application No. 2012-121456 filed in Japan on May 29, 2012.

BACKGROUND OF THE INVENTION

1. Field of the Invention

The present invention relates to an information processing apparatus, a communication system, and a communication method.

2. Description of the Related Art

Conventionally, a method for connecting a plurality of communication networks via an ANI (Application Server Network Interface) is known (for example, see Japanese Laid-open Patent Publication No. 2010-178178). According to the conventional method, separate communication networks are connected with each other via the ANI and an inter-network communication is realized. The ANI is sometimes called an SNI.

Meanwhile, IPv6 (Internet Protocol version 6) is known as a communication protocol to resolve the problem of the IP address exhaustion in IPv4 (Internet Protocol version 4), which is a widely-used communication protocol for a communication network such as the Internet. In recent years, Next Generation Networks (NGN) using IPv6 are constructed. In connecting the NGN to a server that provides various communication services, the method using the ANI is employed.

When the IPv6 is introduced into an existing network of IPv4, usually a network using IPv6 and a network using IPv4 are built side by side. To realize the communication in both IPv4 and IPv6, a computer to which an IP address of IPv4 is assigned is further assigned with an IP address of IPv6.

However, when IP addresses of IPv6 are merely assigned to computers of an existing communication network, a problem may occur in communication between computers via an NGN in some cases.

FIG. 9 is a schematic diagram illustrating an example in which communication cannot be established by an NGN using IPv6.

In the example of FIG. 9, a public communication network 1000 employs IPv4 as its communication protocol. Then, a server 1001 of the public communication network 1000 is newly assigned with an IP address of the IPv6, so that IPv6 can additionally be used as the communication protocol. In this case, the server 1001 has both the IP address of IPv4 and the IP address of IPv6. A communication network n1 illustrated in FIG. 9 is a communication network of IPv6 serving as the public communication network 1000 and a communication network n2 is a communication network of IPv4.

As illustrated in FIG. 9, a Next Generation Network 2000 in which IPv6 is used as an internal communication protocol is present aside from the public communication network 1000. Here, the Next Generation Network 2000 based on IPv6 is a communication network independent from the IPv6 communication network in the public communication network 1000. That is, the Next Generation Network 2000 is a closed communication network. In other words, a terminal 2001 connected to the Next Generation Network 2000, which is independent from the public communication network 1000, cannot perform communication using IPv6 with the server 1001 to which the IP address of IPv6 is assigned in the public communication network 1000.

On the other hand, the terminal 2001 is configured to be connectable to the public communication network 1000 through communication of IPv4.

In the general communication network, a DNS (Domain Name System) server is provided. For example, in the example of FIG. 9, a DNS server 1501 is provided in the public communication network 1000 and a DNS server 1502 is provided in the Next Generation Network 2000. When the DNS server receives an inquiry of an IP address by designation of an URL (Uniform Resource Locator) from each terminal, the DNS server 1500 transmits information indicating an IP address corresponding to a host name of the designated URL to the terminal having queried the IP address. Here, when the designated URL is a URL of a server to which both an IP address of IPv4 and an IP address of IPv6 are assigned, the DNS server transmits both the IP address of IPv4 and the IP address of IPv6 to the terminal.

Each terminal makes a request for establishing communication using the IP address transmitted from the DNS server 1500. When both the IP address of IPv4 and the IP address of IPv6 are transmitted from the DNS server, the terminal first performs a process of establishing communication of IPv6. When the communication of IPv6 is not established, the terminal performs a process of establishing communication of IPv4. In the example of FIG. 9, a terminal 1002 connected to the public communication network 1000 by both IPv4 and IPv6, can establish a communication of IPv6 with the server 1001 without a problem.

On the other hand, as described above, the terminal 2001 first attempts to perform communication of IPv6 with the server 1001 though the communication cannot be established by IPv6 between the server 1001 of the public communication network 1000 and the terminal 2001. Therefore, a waiting time from confirmation of a failure of the communication of IPv6 to transition to the communication of IPv4 may occur. A series of processes in which the waiting time occurs is called "fallback." Since the fallback causes deterioration in a response in use of a communication service from the terminal 2001 inside the Next Generation Network 2000, the fallback is a problem.

To prevent the fallback, it is possible to provide another, separate server connected to the Next Generation Network 2000. However, in this case, since both the server 1001 of the public communication network 1000 and the other server inside the Next Generation Network 2000 are provided, installations and administration cost may be doubled, thereby resulting in considerable ineffectiveness.

Alternatively, it may be possible to distinguish the terminal 1002 connected to the public communication network 1000 from the terminal 2001 connected to the Next Generation Network 2000 based on the IP address assigned to each terminal, and to control the terminal 2001 such that the terminal 2001 does not perform a process of establishing connection of IPv6 when trying to establish connection with the public communication network 1000. However, this method has problems in that an additional mechanism is required to identify each terminal and the fallback may not be prevented in a terminal of which a connection path is unclear.

Accordingly, when the communication of IPv6 is performed, a mechanism is required to establish the connection of IPv6 between mutually independent communication networks, such as the public communication network 1000 and a closed communication network such as the Next Generation Network 2000.

The problems described above in relation to the IPv6 are not problems peculiar to IPv6. Similar problems may occur when communication realized by any new communication protocol is introduced into an existing communication network.

SUMMARY OF THE INVENTION

According to one aspect of an embodiment, an information processing apparatus is connected to and communicates with a terminal. The terminal is connected to at least one of a first communication network and a second communication network using a predetermined communication protocol. The first communication network is operable using the predetermined communication protocol. The second communication network is a closed communication network independent from the first communication network and operable using the predetermined communication protocol. The information processing apparatus includes a first communication unit, and a second communication unit. The first communication unit communicates with the terminal via the first communication network based on the predetermined communication protocol. The second communication unit communicates with the terminal based on the predetermined communication protocol via a relay unit that is arranged in a communication line between the second communication network and the information processing apparatus and relays communication between the second communication network and the information processing apparatus. The first and the second communication units have the same IP address having an anycast relation as an IP address of the predetermined communication protocol.

According to another aspect of an embodiment, a communication system includes a terminal and a server. The terminal is connected to at least one of a first communication network and a second communication network using a first communication protocol. The first communication network is operable using the first communication protocol, and the second communication network is a closed communication network independent from the first communication network and operable using the first communication protocol. The server is configured to communicate with the terminal. The server includes a first communication unit and a second communication unit. The first communication unit communicates with the terminal via the first communication network based on the first communication protocol. The second communication unit communicates with the terminal based on the first communication protocol via a relay unit that is arranged in a communication line between the second communication network and the server and relays communication between the second communication network and the server. The first and the second communication units have the same IP address having an anycast relation as an IP address of the first communication protocol.

According to still another aspect of an embodiment, a communication method of an information processing apparatus that is connected to and communicates with a terminal, the terminal being connected to at least one of a first communication network and a second communication network using a predetermined communication protocol, the first communication network being operable using the predetermined communication protocol, and the second communication network being a closed communication network independent from the first communication network and operable using the predetermined communication protocol, the communication method includes firstly communicating with the terminal via the first communication network based on the predetermined communication protocol, and secondly communicating with the terminal based on the predetermined communication protocol via a relay unit that is arranged in a communication line between the second communication network and the information processing apparatus and relays communication between the second communication network and the information processing apparatus, wherein IP addresses of the predetermined communication protocol of the information processing apparatus used in the firstly communicating and the secondly communicating are the same IP address having an anycast relation.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a communication system 1 according to an embodiment of the invention will be described in detail with reference to the drawings. The embodiment is provided by way of an example and does not limit the invention.

1. Configuration of Communication System

Figure 1:
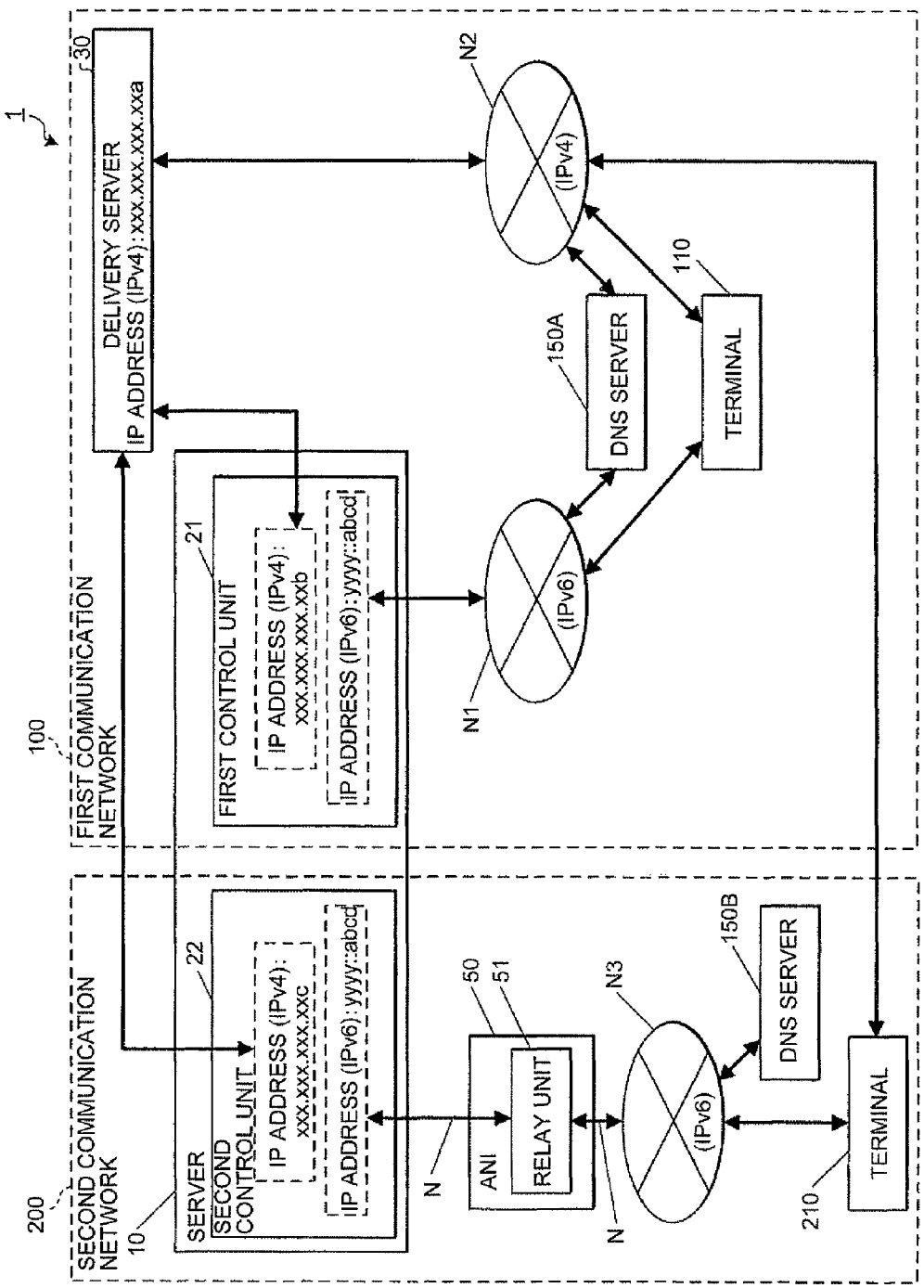
FIG. 1 is a diagram illustrating an example of a configuration of a communication system.

FIG. 1 is a diagram illustrating an example of a configuration of a communication system 1.

A communication system 1 includes terminals 110 and 210, a server 10, and a delivery server 30. The terminals 110 and 210 are connected to one of a first communication network 100 and a second communication network 200 based on a first communication protocol (for example, IPv6). The first communication network 100 is configured so that the first communication protocol is usable. The second communication network 200, which is a closed communication network configured independently from the first communication network 100, uses the first communication protocol as a communication protocol. The server 10 is configured to communicate with the terminals 110 and 210. The delivery server 30 is connected to the first communication network 100 and the second communication network 200 via the server 10.

The first communication network 100 is, for example, a public communication network such as the Internet. In the first communication network 100 according to the embodiment, IPv4 and IPv6 are used as communication protocols by which personal computers (PC) such as the terminal 110, portable terminals, servers, and other various apparatuses connected to the first communication network 100 are connected to communicate with each other. In the embodiment, as described above, IPv6 may be referred to as "the first communication protocol" or "a predetermined communication protocol". Further in the embodiment, IPv4 may be referred to as "a second communication protocol."

The second communication network 200 is, for example, a Next Generation Network and a closed communication network realized by the communication protocol IPv6. The second communication network 200 is configured independently from a communication network of IPv6 of the first communication network 100.

In the embodiment, various information apparatuses such as the terminal 210 connected to the second communication network 200 are connected to communicate with various apparatuses connected to the first communication network 100 by the communication protocol, IPv4.

The IPv6 communication network according to the embodiment may be any communication network of any form in which IP address-based connection is realized based on the IPv6 addresses. For example, a tunneling technology for passing packets by communication of IPv6 in the communication network of IPv4 may be used; a native system entirely in conformity with IPv6 may be used for connecting the terminals mutually performing communication; or any system may be used.

The first communication network 100 and the second communication network 200 may have any configuration as far as they are operable as a communication network. For example, the first communication network 100 and the second communication network 200 may include a telephone network, an ISDN line network, an optical fiber, a mobile communication network, a communication satellite line, a CATV line network, or various communication networks such as a dedicated line and an Internet service provider connected thereto. Further, the first communication network 100 and the second communication network 200 may be a collective communication network in which various communication networks such as a LAN (Local Area Network), a WAN (Wide Area Network), a WiFi (Wireless Fidelity), a Bluetooth (registered trademark), and a NFC (Near Field Communication) are connected to communicate with each other. Any form of connection can be employed, such as a wired connection, a wireless connection, and a mixture of the wired and wireless connections.

In FIG. 1, an IPv6 communication network N3 in the second communication network 200 is illustrated to distinguish from an IPv6 communication network N1 and an IPv4 communication network N2 in the first communication network 100.

2. Terminal

The terminals 110 and 210 are stationary computers such as PCs or workstations, but not limited thereto. For example, the terminals 110 and 210 may be portable terminals such as portable telephones or PDAs (Personal Digital Assistants). Alternatively, the terminals 110 and 210 may be any kinds of information processing apparatuses configured to perform communication.

Figure 2:
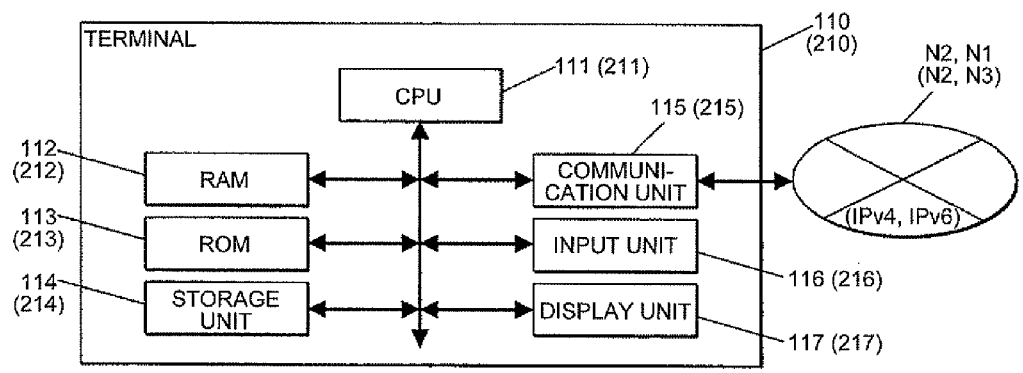
FIG. 2 is a block diagram illustrating an example of a configuration of a terminal.

FIG. 2 is a block diagram illustrating an example of a configuration of the terminals 110 and 210.

First, the terminal 110 will be described.

For example, the terminal 110 includes a CPU (Central Processing Unit) 111, a RAM (Random Access Memory) 112, a ROM (Read Only Memory) 113, a storage unit 114, a communication unit 115, an input unit 116, and a display unit 117.

The CPU 111 reads and processes various programs, data, and the like stored in the ROM 113 or the storage unit 114 and controls various processes of the terminal 110.

The RAM 112 stores various programs and data read by the CPU 111 or temporarily generated parameters or the like.

The ROM 113 and the storage unit 114 store various programs, data, and the like read by the CPU 111. The storage unit 114 is configured by, for example, a hard disk, flash memory, or a combination thereof and also has a function of storing data newly generated by the CPU 111 or data acquired via the communication unit 115.

The communication unit 115 includes, for example, a network interface card (NIC) and has various functions relevant to communication.

The communication unit 115 is connected to the first communication network 100 by the communication protocol, IPv4, and the communication protocol, IPv6. Here, the communication protocol used by the communication unit 115 can be arbitrarily changed. In the embodiment, however, the communication unit 115 prioritizes communication of IPv6 by performing communication of IPv6 rather than communication of IPv4 when possible.

The input unit 116 includes, for example, an input device such as a keyboard, a mouse, or a touch panel. The input unit 116 outputs information to the CPU 111 in response to an instruction input via the input device. The CPU 111 performs a process in response to an instruction input via the input unit 116.

The display unit 117 includes, for example, a display device such as a liquid crystal display, an organic electroluminescence (EL) display, or a CRT (Cathode Ray Tube). The display unit 117 displays information corresponding to the process performed by the CPU 111.

The terminal 210 is a computer that has the same configuration as the terminal 110 except that a communication network connected to communicate based on the communication protocol, IPv6, is the second communication network 200; and thus the detailed description thereof will not be made. The terminal 210 includes, for example, a CPU 211, a RAM 212, a ROM 213, a storage unit 214, a communication unit 215, an input unit 216, and a display unit 217 (see FIG. 2). The terminal 210 is different from the terminal 110 in that the communication unit 215 of the terminal 210 is connected to the second communication network 200 based on the communication protocol, IPv6. The communication unit 215 of the terminal 210 is also connected to the first communication network 100 based on the communication protocol, IPv4. In other respects, each element of the terminal 210 operates and functions in a similar manner to those of the terminal 110.

The CPUs 111 and 211 of the terminals 110 and 210 perform a process of acquiring content from the delivery server 30 in response to a user's instruction input via the input units 116 and 216, respectively. That is, the CPUs 111 and 211 establish communication with the delivery server 30 via the communication units 115 and 215, respectively, to acquire the content of the delivery server 30 through the communication.

3. Server

Figure 3:
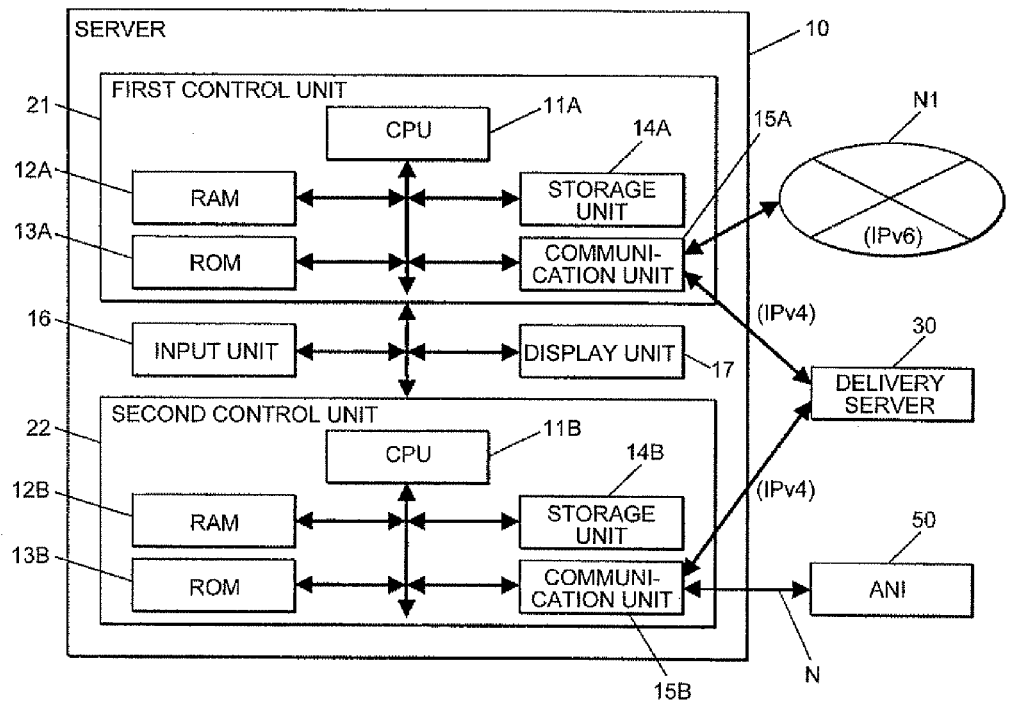
FIG. 3 is a block diagram illustrating an example of a configuration of a server.

FIG. 3 is a block diagram illustrating an example of a configuration of the server 10.

The server 10 is, for example, an information processing apparatus that includes a CPU 11A, a RAM 12A, a ROM 13A, a storage unit 14A, a communication unit 15A, an input unit 16, and a display unit 17.

The CPU 11A reads and processes various programs, data, and the like stored in the ROM 13A or the storage unit 14A and controls various processes of the server 10.

The RAM 12A stores various programs and data read by the CPU 11A or temporarily generated parameters or the like.

The ROM 13A and the storage unit 14A store various programs, data, and the like read by the CPU 11A.

The storage unit 14A is configured by, for example, a hard disk, flash memory, or a combination thereof and also has a function of storing data newly generated by the CPU 11A or data acquired via the communication unit 15A.

The storage unit 14A according to the embodiment is installed as one element of the server 10, but this configuration is merely one example. The invention is not limited thereto. For example, an externally installed storage apparatus (for example, a DB (database) server or the like having a database) may be connected to the server 10 and a storage region of the storage apparatus may be used.

The communication unit 15A includes, for example, a network interface card and has various functions relevant to communication.

The input unit 16 includes, for example, an input device such as a keyboard, a mouse, or a touch panel. The input unit 16 outputs information to the CPU 11A in response to an instruction input via the input device. The CPU 11A performs a process in response to an instruction input via the input unit 16.

The display unit 17 includes, for example, a display device such as a liquid crystal display, an organic electroluminescence display, or a CRT. The display unit 17 displays information corresponding to the process performed by the CPU 11A.

Here, as illustrated in FIG. 3, the server 10 according to the embodiment has two sets of CPUs, RAMs, ROMs, storage units, and communication units; that is, CPUs 11A and 11B, RAMs 12A and 12B, ROMs 13A and 13B, storage units 14A and 14B, and communication units 15A and 15B. Specifically, for example, the server 10 is a server that includes a plurality of blade servers or rack-mount servers each corresponding to one set of the CPU, the RAM, the ROM, the storage unit, and the communication unit. The server 10 may be configured with two sets of blade servers or rack-mount servers, but is merely an example. The invention is not limited thereto.

The communication unit 15A in one set is connected to a different communication network from the one connected to the communication unit 15B of the other set. Specifically, the communication unit 15A is connected to the first communication network 100 and the other communication unit 15B is connected to the second communication network 200.

Hereinafter, a set of the CPU 11A, the RAM 12A, the ROM 13A, the storage unit 14A, and the communication unit 15A which is connected to the IPv6 communication network N1 of the first communication network 100 will be referred to as a first control unit 21; and a set of the CPU 11B, the RAM 12B, the ROM 13B, the storage unit 14B, and the communication unit 15B which is connected to the IPv6 communication network N3 of the second communication network 200 will be referred to as a second control unit 22.

The communication unit 15A of the first control unit 21 is connected to the first communication network 100 based on the communication protocol, IPv6.

The communication unit 15B of the second control unit 22 is connected to the second communication network 200 based on the communication protocol, IPv6.

Both the communication unit 15A of the first control unit 21 and the communication unit 15B of the second control unit 22 are connected to the delivery server 30 based on the communication protocol, IPv4.

In the embodiment, the communication unit 15B of the second control unit 22 is independent from the first communication network 100. That is, communication between the communication unit 15B of the second control unit 22 and an apparatus such as the terminal 110 connected to the first communication network 100 is not established.

The first control unit 21 may include two communication units, one connected to the first communication network 100 and the other connected to the delivery server 30. Likewise, the second control unit may include two communication units, one connected to the second communication network 200 and the other connected to the delivery server 30.

4. ANI

As illustrated in FIG. 1, an ANI 50 is present on a communication line N between the second communication network 200 and the server 10. The ANI 50 relays communication between the second communication network 200 and the server 10.

Specifically, the ANI 50 includes a relay unit 51 that performs communication in conformity with various communication standards including IPv6 based on the OSI reference model. The relay unit 51 relays communication of IPv6 between the second communication network 200 and the server 10.

Specifically, the ANI 50 passes data transmitted from the terminal 210 to the communication unit 15B of the second control unit 22 of the server 10 present outside the second communication network 200 which is a closed communication network in the IPv6 communication network. The ANI 50 also passes data transmitted from the communication unit 15B of the second control unit 22 to the terminal 210. The ANI 50 relays data transmission between a computer which is not limited to the terminal 210 and is connected to the second communication network 200 and the communication unit 15B of the second control unit 22.

The communication line N on which the ANI 50 is provided between, the second communication network 200 and the server 10 is a dedicated line. Specifically, the communication line N is, for example, a communication line in which an optical fiber is used, but not limited thereto. A communication line having any configuration can be used as the communication line N.

5. Delivery Server

The delivery server 30 is an information processing apparatus that is connected to the first communication network 100 and the second communication network 200 via the server 10. The delivery server 30 delivers content in response to a request for acquiring content from various apparatuses (for example, the terminals 110 and 210) connected to the first communication network 100 and the second communication network 200.

Figure 4:
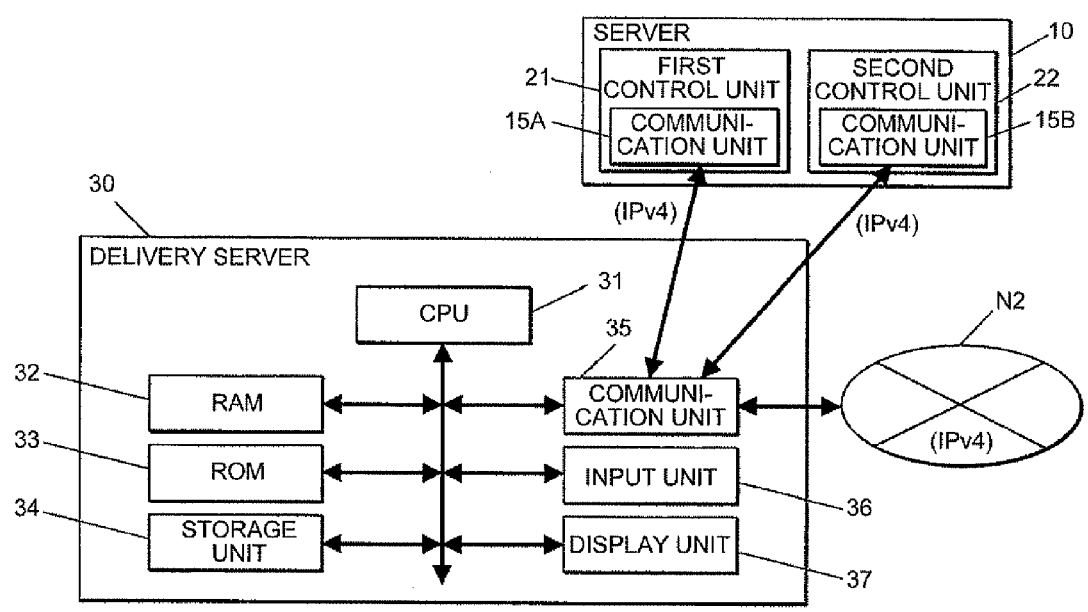
FIG. 4 is a block diagram illustrating an example of a configuration of a delivery server.

FIG. 4 is a block diagram illustrating an example of a configuration of the delivery server 30.

For example, the delivery server 30 includes a CPU 31, a RAM 32, a ROM 33, a storage unit 34, a communication unit 35, an input unit 36, and a display unit 37. The functions of the CPU 31, the RAM 32, the ROM 33, the storage unit 34, the communication unit 35, the input unit 36, and the display unit 37 are the same as the functions of the CPU 11A, the RAM 12A, the ROM 13A, the storage unit 14A, the communication unit 15A, the input unit 16, and the display unit 17 in the server 10. Therefore, only those features of the delivery server 30 different from those of the server 10 will be described below.

The storage unit 34 of the delivery server 30 stores data of content to be delivered by the delivery server 30. Specifically, the storage unit 34 stores, for example, HTML (HyperText Markup Language) files, still image files, moving image files, scripts, Flash®, and other data forming a portal site.

The contents delivered by the delivery server 30 are not particularly limited and may include any data transmitted via the communication line.

The delivery server 30 according to the embodiment has a function of delivering different contents to an apparatus (for example, the terminal 110) connected to the first communication network 100 of IPv6, from contents delivered to an apparatus (for example, the terminal 210) connected to the second communication network 200. That is, the storage unit 34 stores the contents delivered to the first communication network 100 and the contents delivered to the second communication network 200 separately.

The communication unit 35 of the delivery server 30 is connected to the first communication network 100 based on the communication protocol, IPv4. That is, the communication unit 35 has an IP address of IPv4, and is connected to and capable of communicating with apparatuses which are connected to the communication unit 15A of the first control unit 21 and the communication unit 15B of the second control unit 22 of the server 10 or to the IPv4 communication network N2 of the first communication network 100, using IPv4.

6. IP Address

Hereinafter, communication between the server 10, and the first communication network 100 and the second communication network 200 will be described. In particular, an IP address will be described.

The communication unit 15A of the first control unit 21 and the communication unit 15B of the second control unit 22 of the server 10 have the same IP address having an anycast relation as an IP address of the first communication protocol (IPv6). That is, in regard to the communication performed based on IPv6, according to the embodiment, an IP address of the server 10 used in a connection process when the terminal 110 establishes the communication with the communication unit 15A of the first control unit 21 via the first communication network 100 is the same as an IP address of the server 10 used in a connection process when the terminal 210 establishes communication with the communication unit 15B of the second control unit 22 via the second communication network 200, the communication line N, and the ANI 50.

In FIG. 1 and the like, an IP address of IPv6 is described as "yyyy::abcd." However, in practice, addresses in which 128-bit addresses are partitioned in a 16-bit unit by colons (:) are IP addresses of IPv6. For example, the address is described as "aaaa:bbbb:cccc:dddd:1111:2222:3333:4444."

The terminals 110 and 210 can communicate with DNS servers 150A and 150B (hereinafter collectively referred to as DNS server 150), respectively. In the embodiment, one DNS server is provided in each of the first communication network 100 and the second communication network 200. However, the DNS server may be connected to any communication network as far as the communication between the terminals 110 and 210 and the DNS servers 150A and 150B can be realized.

The DNS server 150 provides each terminal with information indicating an IP address in response to an inquiry of the IP address corresponding to the host name of each terminal.

Here, the DNS server 150 provides at least an IP address of IPv6 as an IP address corresponding to the host name. In this embodiment, the DNS server 150 provides, for example, an IP address of IPv4 and an IP address of IPv6.

An IP address and a host name used in the DNS server 150 have a one-to-one correspondence relation. That is, when the plurality of DNS servers 150 are present and the DNS server 150 to which each terminal makes an inquiry is a different DNS server 150, but when the host name to which the terminal makes an inquiry is the same, the IP address of IPv4 and the IP address of IPv6 provided in response to the inquiry by each DNS server 150 is the same as each other.

In the embodiment, the DNS server 150 causes the host name of the delivery server 30 to correspond to the IP address of IPv6 which the communication unit 15A of the first control unit 21 and the communication unit 15B of the second control unit 22 of the server 10 have. That is, when the terminals 110 and 210 make an inquiry of the IP address to the DNS servers 150A and 150B, respectively, using the host name of the delivery server 30, the DNS server 150A and 150B provide the terminals 110 and 210 with information indicating the IP address of IPv6 which the communication unit 15A of the first control unit 21 and the communication unit 15B of the second control unit 22 of the server 10 have, respectively.

The terminals 110 and 210 perform a process of establishing connection with a host to be connected using the IP address provided from the DNS servers 150A and 150B, respectively. Accordingly, in the embodiment, when an attempt to be connected to the delivery server 30 is made according to the communication protocol, IPv6, the terminals 110 and 210 are connected to the server 10.

7. Communication Establishment and Delivery

The server 10 establishes a communication with the terminals 110 and 210 according to IPv6 and relays the communication between each of the terminals 110 and 210 and the delivery server 30.

Figure 5:
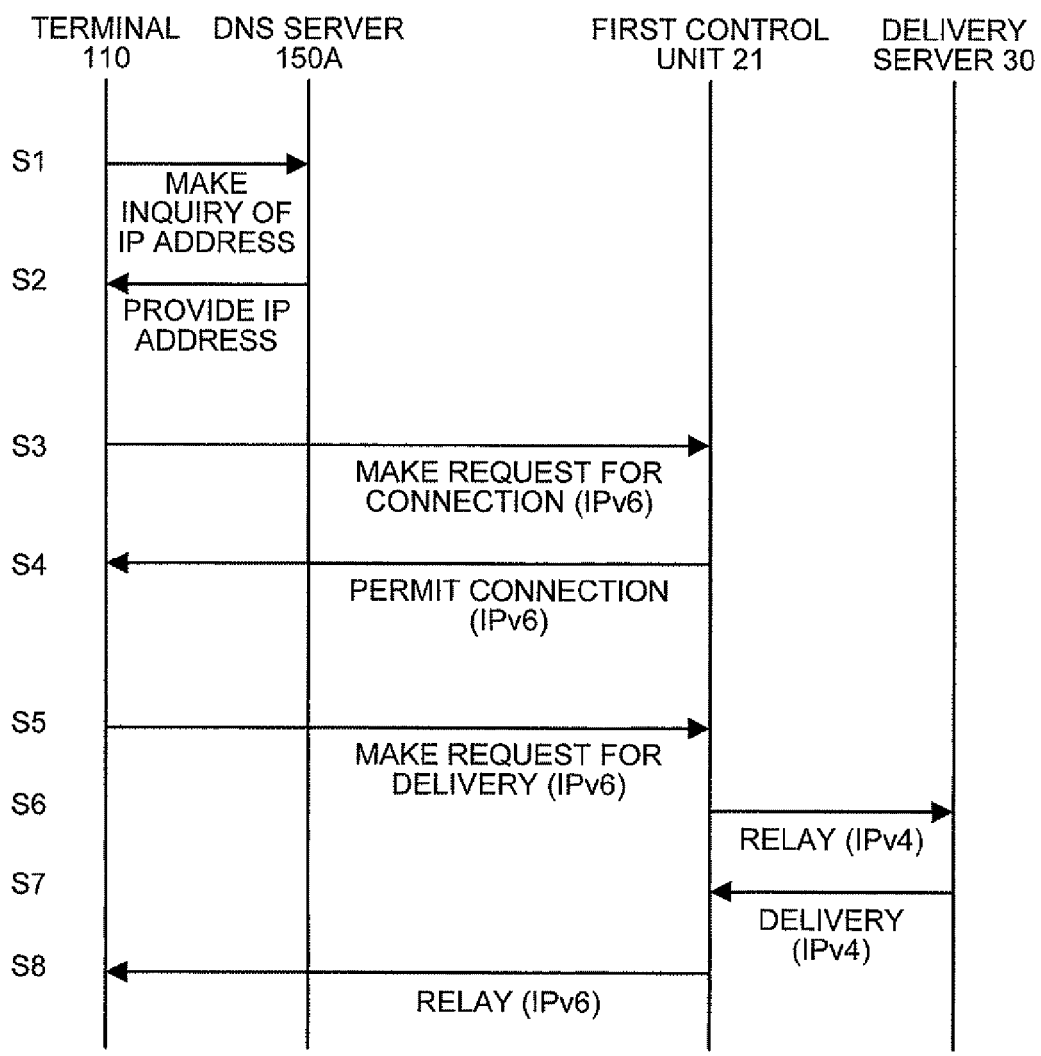
FIG. 5 is a time chart illustrating an example of flow of a process relevant to communication from a terminal connected to a first communication network.
Figure 6:
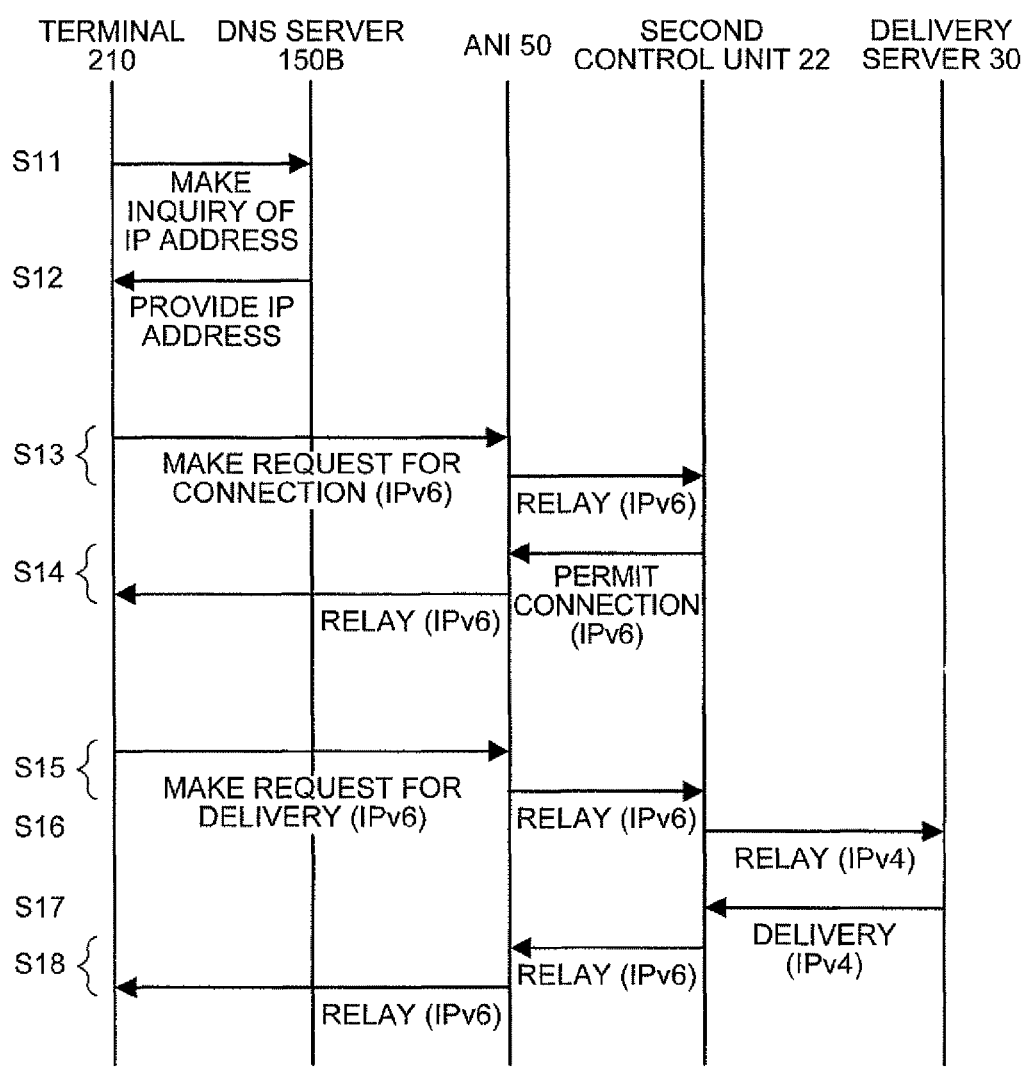
FIG. 6 is a time chart illustrating an example of flow of a process relevant to communication from a terminal connected to a second communication network.

Hereinafter, the flow of a process relevant to the establishment of the communication between each terminal 110, 210 and the delivery server 30 and the delivery of the content from the delivery server 30 will be described with reference to FIGS. 5 and 6.

First, the flow of a process relevant to the communication from the terminal 110 connected to the first communication network 100 will be described with reference to the time chart illustrated in FIG. 5.

First, the terminal 110 makes an inquiry of the IP address to the DNS server 150A using the host name of the delivery server 30 (step S1). In response to the inquiry, the DNS server 150A provides the terminal 110 with the IP address of IPv6 which the communication unit 15A of the first control unit 21 and the communication unit 15B of the second control unit 22 of the server 10 have (step S2).

The terminal 110 makes a request for connection to a unit which has the IP address of IPv6 provided from the DNS server 150A, that is, the first control unit 21 of the server 10 (step S3). Here, the terminal 110 makes a request for the establishment of the communication to the first control unit 21, since the communication unit 15B of the second control unit 22 is not present within the communication network from the viewpoint of the terminal 110 connected to the first communication network 100 according to the communication protocol, IPv6. When receiving the request, the CPU 11A of the first control unit 21 makes a response indicating permission of the connection to the terminal 110 (step S4). Thus, the communication with the delivery server 30 according to the communication protocol, IPv6, is established from the viewpoint of the terminal 110.

The terminal 110 makes a request for delivery of the content to the delivery server 30 (step S5). When receiving the request, the first control unit 21 relays the request (step S6). That is, the first control unit 21 makes the request for the delivery of the content to the delivery server 30 according to the communication protocol, IPv4. The delivery server 30 transmits data of the requested content in response to the request from the server 10 (step S7). When the data of the content is transmitted, the first control unit 21 relays the data (step S8) and transmits the data to the terminal 110 according to the communication protocol, IPv6. Through the above-described process, the terminal 110 can establish the communication according to the communication protocol, IPv6, and acquire the content from the delivery server 30.

Next, the flow of a process relevant to communication from the terminal 210 connected to the second communication network 200 will be described with reference to the time chart illustrated in FIG. 6.

First, the terminal 210 makes an inquiry of the IP address to the DNS server 150B using the host name of the delivery server 30 (step S11). In response to the inquiry, the DNS server 150B provides the terminal 210 with the IP address of IPv6 which the communication unit 15A of the first control unit 21 and the communication unit 15B of the second control unit 22 of the server 10 have (step S12).

The terminal 210 makes a request for connection to a unit which has the IP address of IPv6 provided from the DNS server 150B, that is, the second control unit 22 of the server 10 (step S13). Here, the terminal 210 makes a request for the establishment of the communication to the second control unit 22, since the communication unit 15A of the first control unit 21 is not present within the communication network from the viewpoint of the terminal 210 connected to the second communication network 200 according to the communication protocol, IPv6. Further, the ANI 50 on the communication line N relays the communication between the terminal 210 and the communication unit 15B of the second control unit 22. When receiving the request for the establishment of the communication from the terminal 210, the CPU 11B of the second control unit 22 makes a response indicating permission of the connection to the terminal 210 (step S14). Thus, the communication with the delivery server 30 according to the communication protocol, IPv6, is established from the viewpoint of the terminal 210.

The terminal 210 makes a request for delivery of the content to the delivery server 30 (step S15). When receiving the request, the second control unit 22 relays the request (step S16). That is, the second control unit 22 makes a request for the delivery of the content to the delivery server 30 according to the communication protocol, IPv4. The delivery server 30 transmits data of the requested content in response to the request from the server 10 (step S17). When the data of the content is transmitted, the second control unit 22 relays the data (step S18) and transmits the data to the terminal 210 according to the communication protocol, IPv6. Through the above-described process, the terminal 210 can establish the communication according to the communication protocol, IPv6, and acquire the content from the delivery server 30.

When receiving an inquiry of the IP address using the host name of the delivery server 30 from each terminal, the DNS servers 150A, 150B deliver the IP address of IPv6 which the communication unit 15A of the first control unit 21 and the communication unit 15B of the second control unit 22 of the server 10 have and the IP address of IPv4 which the delivery server 30 has. Thus, a computer which does not correspond to the communication protocol, IPv6, among the computers connected to the first communication network 100 can establish communication with the delivery server 30 and acquire content. The terminals 110 and 210 can also communicate with the delivery server 30 intentionally based on the communication protocol, IPv4.

8. Identification of Delivery Destination of Content

The delivery server 30 may set content to be delivered to a terminal (for example, the terminal 110) communicating with the first control unit 21 to be different from content to be delivered to a terminal (for example, the terminal 210) communicating with the second control unit 22. In this case, the delivery server 30 identifies which of the first control unit 21 and the second control unit 22 the terminal communicates with, and determines the content to be delivered according to the identification result.

Hereinafter, control of the delivery server 30 relevant to the delivery of the content will be described with reference to the flowchart of FIG. 7.

When the delivery server 30 receives the request for the delivery of the content via the communication unit 35 (step S21), the CPU 31 determines from which of the first control unit 21 and the second control unit 22 the request is received. For example, the CPU 31 determines whether the request is received from the first control unit 21 (step S22). Here, when the CPU 31 determines that the request is received from the first control unit 21 (YES in step S22), the CPU 31 reads the content to be delivered to the first communication network 100 from the storage unit 34 and transmits the content to the server 10 (step S23). Conversely, when the CPU 31 determines that the request is not received from the first control unit 21 (NO in step S22), that is, when the CPU 31 determines that the request is received from the second control unit 22, the CPU 31 reads the content to be delivered to the second communication network 200 from the storage unit 34 and transmits the content to the server 10 (step S24).

Figure 7:
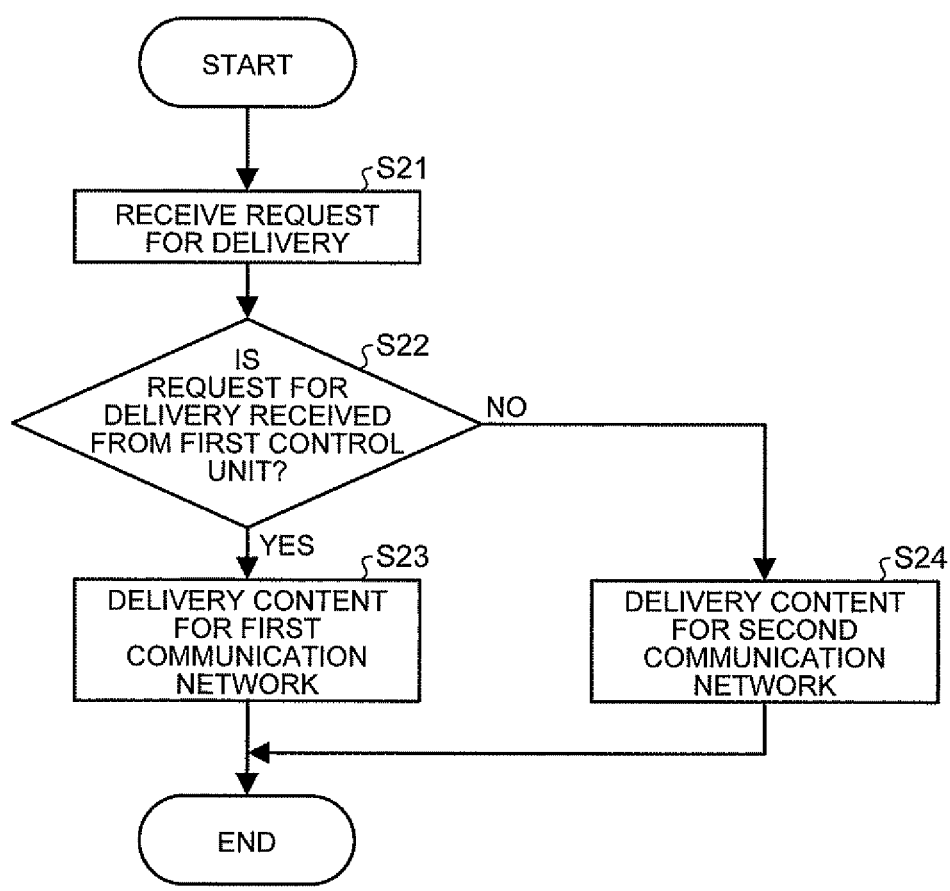
FIG. 7 is a flowchart illustrating an example of control of the delivery server relevant to delivery of content.

In the control relevant to the delivery of the content in the above description and FIG. 7, the CPU 31 determines whether the request for the delivery of the content is received from the first control unit 21, and thus the delivery server 30 determines from which of the first control unit 21 and the second control unit 22 the request is received. The embodiment, however, is provided by way of example only and the invention is not limited thereto. For example, it may be determined whether the request for the delivery of the content is received from the second control unit 22. Further, the process of step S22 may be a branch conditionally executed depending on a relay source of the request of the delivery of the content.

In the embodiment, the IP addresses of IPv4 which the first control unit 21 and the second control unit 22 have in order to communicate with the delivery server 30 are different from each other. Accordingly, for example, the delivery server 30 can identify the first control unit 21 and the second control unit 22 according to the IP address of IPv4 which the first control unit 21 has and the IP address of IPv4 which the second control unit 22 has. The IP address is merely an example of information which can be used for identifying the relay source. Any information can be used for identifying the first control unit 21 and the second control unit 22.

Alternatively, the delivery server 30 may deliver the same content to both a terminal (for example, the terminal 110) communicating with the first control unit 21 and a terminal (for example, the terminal 210) communicating with the second control unit 22.

9. Advantages of Embodiment

In the communication system 1 according to the embodiment, as described above, the server 10 includes the first control unit 21 that communicates with the terminal 110 via the first communication network 100 based on the communication protocol, IPv6, and the second control unit 22 that is installed in the communication line N between the second communication network 200 and the server 10 and communicates with the terminal 210 based on the communication protocol, IPv6, via the ANI 50 relaying the communication between the second communication network 200 and the server 10. Since the communication of the communication protocol, IPv6, with the second communication network 200 which is the closed communication network with respect to the first communication network 100 can be established via the ANI 50 and the second control unit 22, the fallback can be prevented from occurring. Therefore, it is possible to provide a more comfortable communication environment in which the communication protocol, IPv6, is used.

Since the communication unit 15A of the first control unit 21 and the communication unit 15B of the second control unit 22 have the same IP address having an anycast relation as the IP address of IPv6, the IP addresses of IPv6 used when the terminal 110 is connected to the communication unit 15A of the first control unit 21 and when the terminal 210 is connected to the communication unit 15B of the second control unit 22 are the same as each other. Hence, the DNS servers 150A, 150B can make the host name uniquely corresponds to the IP address of IPv6 both in connecting to the server 10 from the first communication network 100 and in connecting to the server 10 from the second communication network 200. Accordingly, when the terminal 110 is connected to the server 10 and when the terminal 210 is connected to the server 10, a connection destination viewed from each terminal is seemingly the same. Thus, a user of the terminal can use various communication services provided by the delivery server 30 or the like of the communication system 1 without noticing which of the first communication network 100 and the second communication network 200 his/her terminal is being connected. In other words, the usability of the communication system 1 is the same no matter which terminal is used to connect to the server 10. Thus, even when the first communication network 100 is working as an IPv4 communication network to which the server 10 is connected, another protocol, i.e., IPv6 can be introduced. Further, a communication can be established between the second communication network 200, which is an independent IPv6 communication network, and the server 10. Thus, an IPv6 communication network provided in an existing IPv4 communication network and another independent IPv6 communication network can operate simultaneously.

In addition, it is not necessary to separately provide the DNS server 150A used in the first communication network 100 and the DNS server 150B used in the second communication network 200. Further, both the connection from the terminal 110 to the server 10 and the connection from the terminal 210 to the server 10 can be realized without special setting on a process relevant to identification of an IP address in response to an inquiry to the DNS server 150A, 150B. Therefore, it is possible to reduce load relevant to administration of the IP addresses of the communication system 1.

Since content of the delivery server 30 can be delivered to an apparatus (for example, the terminal 210) of the second communication network 200 without separately providing another delivery server connected to the second communication network 200, it is not necessary to separately provide a delivery server in the second communication network 200 and it is possible to reduce load relevant to the administration of the delivery server 30.

Further, it is not necessary to use a conventional method such as a method of determining a communication network to which each terminal is connected by an IP address or the like assigned to each terminal and restricting a communication protocol. It is possible to further simplify the control relevant to the establishment of the communication. Therefore, it is possible to further reduce the load of the administration in the communication system 1.

Since the delivery server 30 can be provided which delivers the content to the terminals 110 and 210 or the like through the communication by the communication unit 15A of the first control unit 21 or the communication unit 15B of the second control unit 22 of the server 10, it is possible to provide a service by the delivery of the content to each terminal. Therefore, the user of the terminal can have various experiences by the content, and it is possible to provide various business opportunities through the content.

Since the server 10 relays the communication between the terminal or the like and the delivery server 30, the service provided by the delivery of the content from the delivery server 30 can be provided to the side of the second communication network 200 even when the communication is not established directly by IPv6 between the delivery server 30 and a computer such as the terminal 210 connected to the second communication network 200.

Further, the delivery server 30 identifies which of the first control unit 21 and the second control unit 22 communicates with the terminal. Then, the delivery server 30 delivers different contents to a terminal (for example, the terminal 110) communicating with the first control unit 21 from the contents delivered to a terminal (for example, the terminal 210) communicating with the second control unit 22 according to the identification result. Thus, different services can be provided to each communication network. For example, when it is expected that contents (e.g., advertisement) would be changed for each area or for each group of users depending on their tendency, it is possible to select and deliver most suitable contents for each communication network. The manner and advantageous effect of contents delivery described herein are merely examples, and the invention is not limited thereto. When service provided by contents delivery is changed for each communication network, various additional advantageous effects may be obtained.

Since the communication line N between the second communication network 200 and the server 10 is a dedicated line, higher performance requirements can be set regarding communication quality such as establishment of communication, period the communication is maintained, and communication rate for the communication between the second communication network 200 and the server 10.

Since the communication protocol is IPv6 in the communication between the server 10 and the terminals 110 and 210, additional apparatuses can be connected to the communication system 1 using a large number of IP addresses.

Since the communication protocol used in the communication between the server 10 and the delivery server 30 is different from the communication protocol in the communication between the server 10 and the terminals 110 and 210, the communication protocol of the communication network to which the delivery server 30 is connected is not limited to the communication protocol between the server 10 and the first communication network 100 and the second communication network 200.

Specifically, for example, a communication network using IPv6 can be connected to the delivery server 30 which is connected to the communication network of IPv4. The manner and advantageous effects of delivery as described above are mere examples and not limiting. Still more advantageous effects may be obtained by expansion of choices of the communication protocol.

Since the first control unit 21 and the second control unit 22 each include a separate control unit, the process load of the communication between each communication network and the server 10 can be distributed to each communication network. Further, the performance design for the connection of each communication network and the server 10 can be done more easily, and the system can be constructed more flexibly based on the performance requirement set according to the scale of each communication network.

10. Others

The embodiment described herein is a mere example in all respects and the invention is not considered to be limited thereto. The scope of the invention is not defined by the above description, but is defined by the claims and is intended to include the meanings equivalent to the scope of the claims and all of the modifications within the scope.

For example, the first communication protocol (predetermined protocol) and the second communication protocol are not limited to IPv6 and IPv4, and cover other communication protocols.

Further, the IPv4 communication network N2 may be omitted from the embodiment. Even when a communication line of IPv4 is not provided, the server 10, and the first communication network 100 and the second communication network 200 can establish communication of IPv6.

The first communication network 100 and the second communication network 200 are not limited to a public communication network and a Next Generation Network, but communication networks of other forms may be used. As far as the second communication network 200 is an independent, closed communication network with respect to the first communication network 100 in the predetermined communication protocol, any communication networks can be employed as the first and the second communication networks 100 and 200.

The plurality of second communication networks 200 independent from each other may be constructed as communication networks of the predetermined communication protocol. In this case, the server 10 includes more than one second control unit 22 corresponding to the number of second communication networks 200, and each of the plurality of second communication networks may be connected to one of the plurality of second control units. Alternatively, the plurality of second communication networks 200 may be connected to one second control unit 22.

When the plurality of second communication networks 200 are present, content to be delivered to each of the second communication networks 200 may be set as in the case of the content to be delivered to the first communication network 100 and the content to be delivered to the second communication network 200. For example, the content to be delivered to each of the plurality of second communication networks 200 may be different from each other, or the same content may be delivered to some or all of the second communication networks 200.

The number of control units included in the server 10 may be one. For example, the control unit may logically function as a plurality of control units by a program (software). One server 10 may include more than one control unit. Alternatively, one information processing apparatus which functions as the first control unit 21 may be provided separately from one information processing apparatus which functions as the second control unit 22; and both information processing apparatuses may function as separate independent hardware which realizes the function as described above in the embodiment.

In the above-described embodiment, the server 10 and the delivery server 30 are separately installed. However, one information processing apparatus may have the functions of the first control unit 21, the second control unit 22, and the delivery server 30 as a first communication unit, a second communication unit, and a delivery unit. In this case, communication among the first communication unit, the second communication unit, and the delivery unit can be done in one apparatus. Further, as in the delivery server 30, the information processing apparatus may include a control unit that identifies which of the first communication unit and the second communication unit a terminal communicates with and delivers different contents to a terminal communicating with the first communication unit from the contents delivered to a terminal communicating with the second communication unit according to the identification result. For example, the information processing apparatus functions as each of the units by executing a software program functioning to correspond to each of the units by a computer. Alternatively, dedicated hardware corresponding to each unit may be installed.

Figure 8:
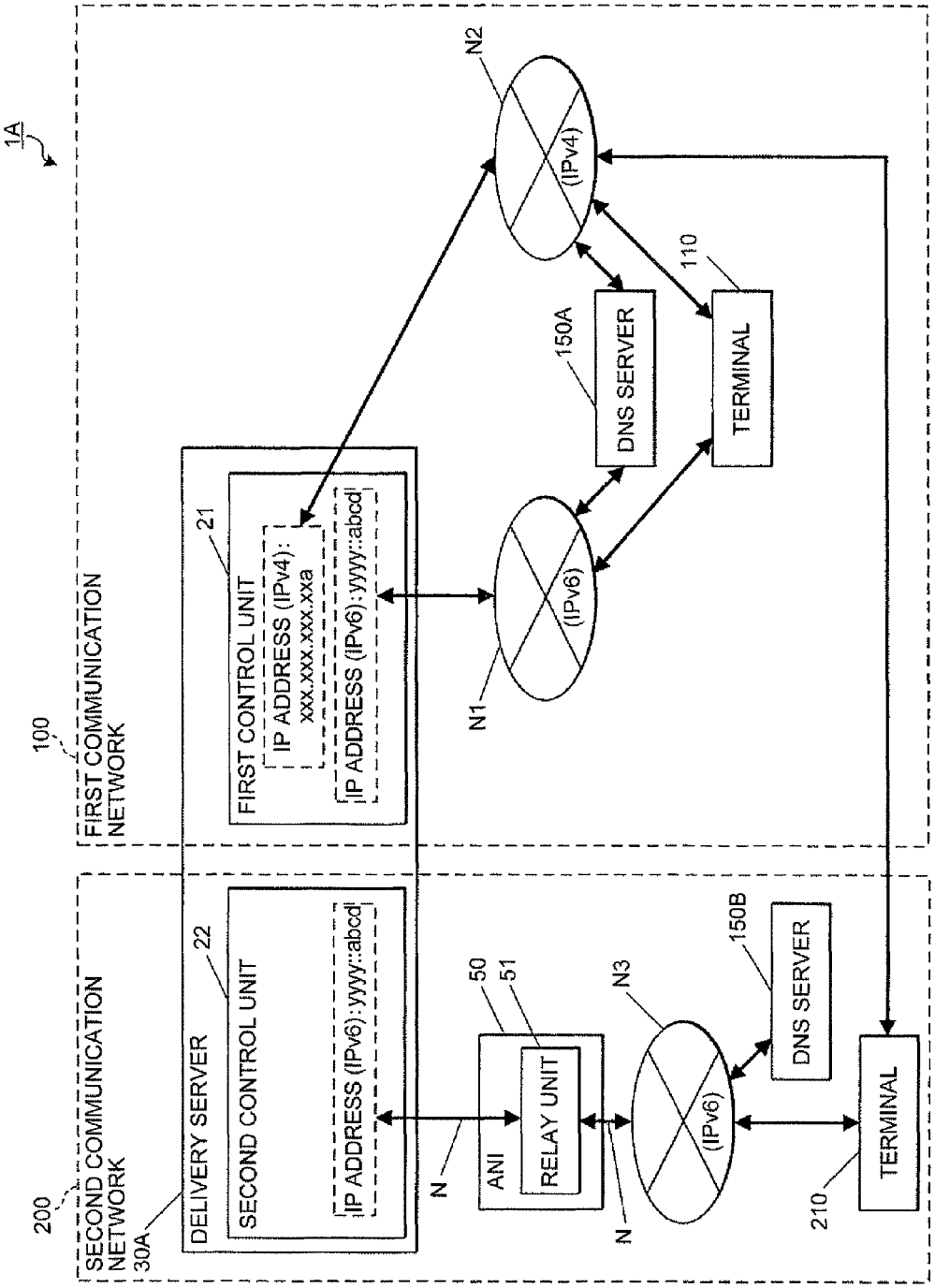
FIG. 8 is a diagram illustrating an example of a configuration of a delivery server including first and second control units.
Figure 9:
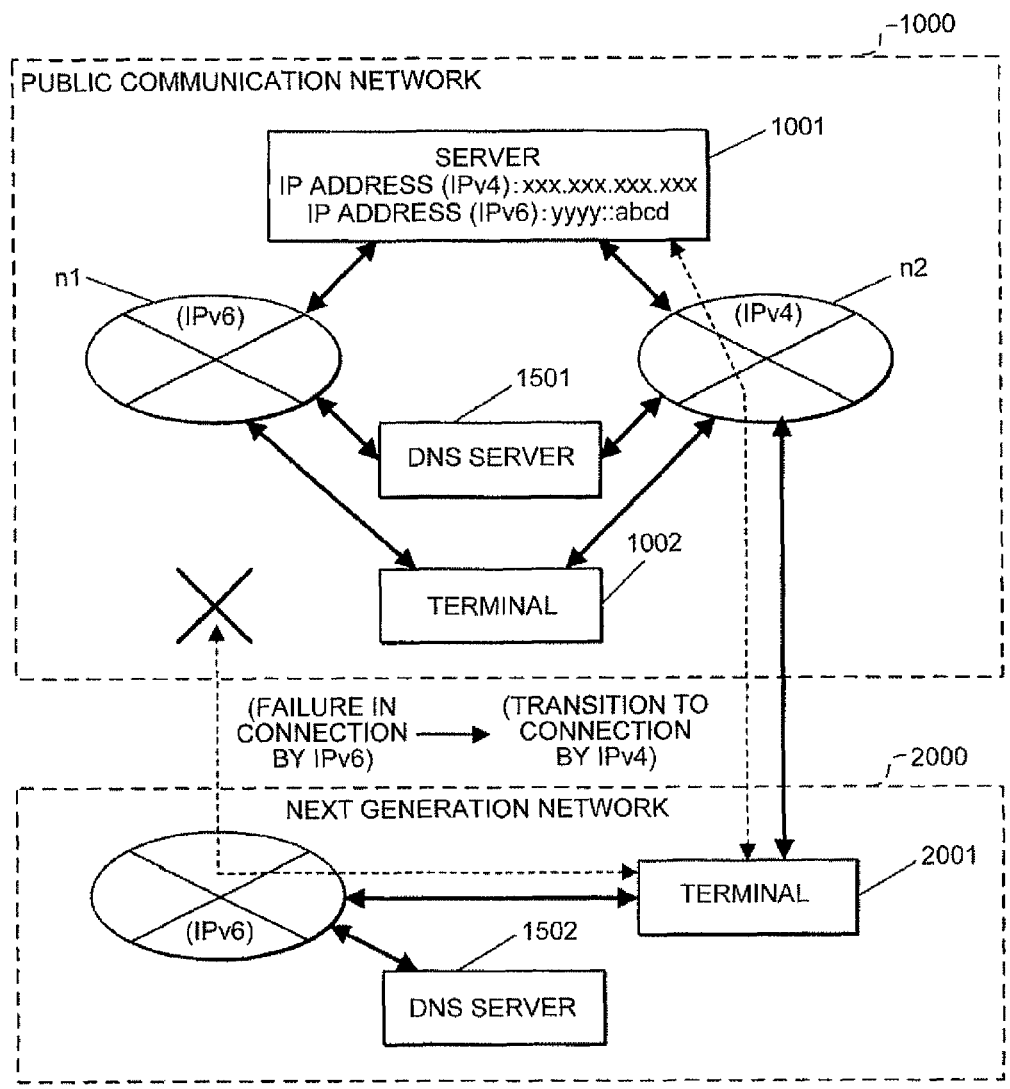
FIG. 9 is a schematic diagram illustrating an example in which communication cannot be established by an NGN using IPv6.

FIG. 8 illustrates an example of a communication system 1A where a delivery server 30A is arranged in place of the server 10 of FIG. 1. The delivery server 30A has a function of delivering contents and includes the first control unit 21 and the second control unit 22 of the server 10. As in the delivery server 30A, the function of the server 10 and the function of the delivery server 30 may be integrated into one information processing apparatus. As illustrated in FIG. 8, the first control unit 21 may control the connection to the IPv4 communication network N2 of the first communication network 100. Further, in the example of FIG. 8, communication between the first control unit 21 or the second control unit 22 and the functional unit of the delivery server 30 that delivers the contents as illustrated in FIG. 1 is not necessary. Hence, in the example of FIG. 8, the second control unit 22 does not need to have an IP address of IPv4.

In the configuration illustrated in FIG. 8, the delivery server 30A may further be connected to and communicate with various servers or storages such as a DB server storing content to be delivered, and the delivery server 30A may use the function of the server or the storage.

In the embodiment described above and illustrated in FIG. 1, the delivery server 30 is directly connected to IPv4 communication network N2 based on the communication protocol, IPv4. However, the first control unit 21 may relay the communication of the delivery server 30 by the communication protocol, IPv4.

In the above-described embodiment, the communication unit 15B of the second control unit 22 is independent from the first communication network 100, but this configuration is merely an example. The invention is not limited thereto. As far as the second control unit 22 can communicate with the second communication network 200 using the first communication protocol (predetermined communication protocol), any form of connection can be employed.

Besides, the number of nodes such as each terminal, the delivery server, and the DNS server according to the above-described embodiment is merely an example and can appropriately be modified.

Each element in the claims may be a section, a module, a unit, or the like or may be a circuit corresponding to each element. Each element may not necessarily be independent hardware. Single hardware may logically function as two or more units through a software process or the like.

Thus, according to an embodiment, it is possible to establish communication between mutually independent communication networks.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

11. Note

In addition to the embodiments as described above, some notes are provided below.

Note 1. An information processing apparatus that is connected to and communicates with a terminal, the terminal being connected to at least one of a first communication network and a second communication network using a predetermined communication protocol, the first communication network being operable using the predetermined communication protocol, and the second communication network being a closed communication network independent from the first communication network and operable using the predetermined communication protocol, the information processing apparatus comprising:

a first communication unit that communicates with the terminal via the first communication network based on the predetermined communication protocol; and a second communication unit that communicates with the terminal based on the predetermined communication protocol via a relay unit that is arranged in a communication line between the second communication network and the information processing apparatus and relays communication between the second communication network and the information processing apparatus, wherein the first and the second communication units have the same IP address having an anycast relation as an IP address of the predetermined communication protocol.

Note 2. The information processing apparatus according to note 1, further comprising:

a delivery unit that delivers content to the terminal through the communication performed by one of the first and the second communication units.

Note 3. The information processing apparatus according to note 2, further comprising:

an identification unit that identifies which of the first communication unit and the second communication unit the terminal communicates with; and a control unit that sets content to be delivered to a terminal communicating with the first communication unit to be different from content to be delivered to a terminal communicating with the second communication unit according to an identification result obtained by the identification unit.

Note 4. The information processing apparatus according to any one of notes 1 to 3, wherein the communication line between the second communication network and the information processing apparatus is a dedicated line.

Note 5. The information processing apparatus according to any one of notes 1 to 4, wherein the predetermined communication protocol is IPv6.

Note 6. A communication system comprising:

a terminal that is connected to at least one of a first communication network and a second communication network using a first communication protocol, the first communication network being operable using the first communication protocol, and the second communication network being a closed communication network independent from the first communication network and operable using the first communication protocol; and a server that is configured to communicate with the terminal, the server including:

a first communication unit that communicates with the terminal via the first communication network based on the first communication protocol; and a second communication unit that communicates with the terminal based on the first communication protocol via a relay unit that is arranged in a communication line between the second communication network and the server and relays communication between the second communication network and the server, and wherein the first and the second communication units have the same IP address having an anycast relation as an IP address of the first communication protocol.

Note 7. The communication system according to note 6, further comprising:

a delivery server that is connected to the first and the second communication networks via the server and delivers content to the terminal, wherein the server relays communication between the terminal and the delivery server.

Note 8. The communication system according to note 7, wherein a communication protocol used in communication between the server and the delivery server is a second communication protocol different from the first communication protocol.

Note 9. The communication system according to any one of notes 6 to 8, wherein the first and the second communication units each include a separate control unit.

Note 10. The communication system according to any one of notes 6 to 9, wherein the first communication protocol is IPv6.

Note 11. A communication method of an information processing apparatus that is connected to and communicates with a terminal, the terminal being connected to at least one of a first communication network and a second communication network using a predetermined communication protocol, the first communication network being operable using the predetermined communication protocol, and the second communication network being a closed communication network independent from the first communication network and operable using the predetermined communication protocol, the communication method comprising:

firstly communicating with the terminal via the first communication network based on the predetermined communication protocol; and secondly communicating with the terminal based on the predetermined communication protocol via a relay unit that is arranged in a communication line between the second communication network and the information processing apparatus and relays communication between the second communication network and the information processing apparatus, wherein IP addresses of the predetermined communication protocol of the information processing apparatus used in the firstly communicating and the secondly communicating are the same IP address having an anycast relation.

Note 12. A communication method between a terminal and a server in a communication system, the terminal being connected to at least one of a first communication network and a second communication network using a first communication protocol, the first communication network being operable using the first communication protocol, and the second communication network being a closed communication network independent from the first communication network and operable using the first communication protocol, and the server being configured to communicate with the terminal, the communication method comprising:

firstly causing the server and the terminal to communicate with each other via the first communication network based on the predetermined communication protocol; and secondly causing the server and the terminal to communicate with each other based on the predetermined communication protocol via a relay unit that is arranged in a communication line between the second communication network and the server and relays communication between the second communication network and the server, wherein IF addresses of the predetermined communication protocol of the server used in the firstly causing and the secondly causing are the same IF address having an anycast relation.

What is claimed is:

1. An information processing apparatus that is connected to and communicates with a terminal, the information processing apparatus comprising:
   (i) a first circuit that communicates with the terminal via a first communication network based on a predetermined communication protocol; and
   (ii) a second circuit that communicates with the terminal based on the predetermined communication protocol via a relay that is arranged in a second communication network to relay communication between the terminal and the information processing apparatus, the second communication network being a closed communication network independent from the first communication network,
   wherein the first and the second circuits have (1) a same Internet Protocol (IP) address having an anycast relation as an IP address of the predetermined communication protocol and (2) different IP addresses of another communication protocol which is different from the predetermined communication protocol.

2. The information processing apparatus according to claim 1, further comprising:
   a central processing unit (CPU) that executes a process comprising delivering content to the terminal through the communication performed by one of the first and the second circuits.

3. The information processing apparatus according to claim 2, wherein the CPU further executes a process comprising:
   identifying which of the first circuit and the second circuit the terminal communicates with; and
   setting content to be delivered to a terminal communicating with the first circuit to be different from content to be delivered to a terminal communicating with the second circuit according to an identification result obtained in the identifying.

4. The information processing apparatus according to claim 1, wherein a communication line which is connected to the relay and which includes a communication line between the relay and the information processing apparatus is a dedicated line.

5. The information processing apparatus according to claim 1, wherein the predetermined communication protocol is IPv6.

6. A communication system comprising:
   a terminal that is connected to at least one of a first communication network and a second communication network using a first communication protocol, the first communication network being operable using the first communication protocol, and the second communication network being a closed communication network independent from the first communication network and operable using the first communication protocol; and
   a server that is configured to communicate with the terminal,
   the server including:
   (i) a first circuit that communicates with the terminal via the first communication network based on the first communication protocol; and
   (ii) a second circuit that communicates with the terminal based on the first communication protocol via a relay that is arranged in a second communication network to relay communication between the terminal and the server, and
   wherein the first and the second circuits have (1) a same Internet Protocol (IP) address having an anycast relation as an IP address of the first communication protocol and (2) different IP addresses of the second communication protocol.

7. The communication system according to claim 6, further comprising:
   a delivery server that is connected to the first and the second communication networks via the server and delivers content to the terminal,
   wherein the server relays communication between the terminal and the delivery server.

8. The communication system according to claim 7, wherein a communication protocol used in communication between the server and the delivery server is the second communication protocol different from the first communication protocol.

9. The communication system according to claim 6, wherein the first and the second circuits each include a separate controller.

10. The communication system according to claim 6, wherein the first communication protocol is IPv6.

11. A communication method of an information processing apparatus that is connected to and communicates with a terminal, the communication method comprising:
- firstly communicating, using a first circuit, with the terminal via a first communication network based on a predetermined communication protocol; and
- secondly communicating, using a second circuit, with the terminal based on the predetermined communication protocol via a relay that is arranged in a second communication network to relay communication between the terminal and the information processing apparatus, the second communication network being a closed communication network independent from the first communication network,
- wherein Internet Protocol (IP) addresses used in the firstly communicating and the secondly communicating are a same IP address of the predetermined communication protocol having an anycast relation while the first circuit and the second circuit have different IP addresses of another communication protocol which is different from the predetermined communication protocol.

* * * * *